May 9, 1944. R. Y. CASE 2,348,522
CUT TOOTH POWER TRANSMISSION BELT AND BLANK FOR THE SAME
Original Filed March 13, 1941 2 Sheets-Sheet 2
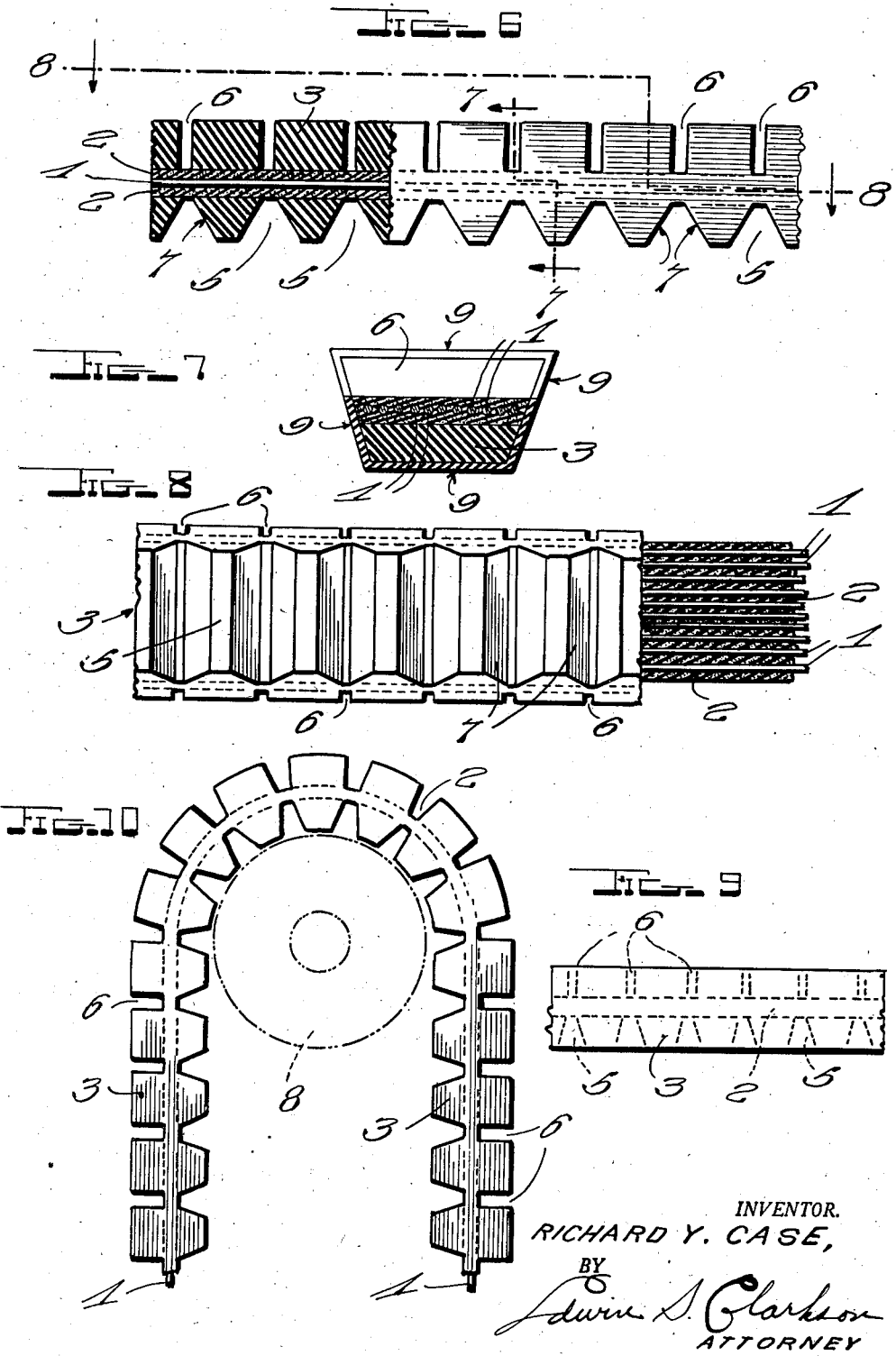
INVENTOR.
RICHARD Y. CASE,
BY
ATTORNEY Patented May 9, 1944

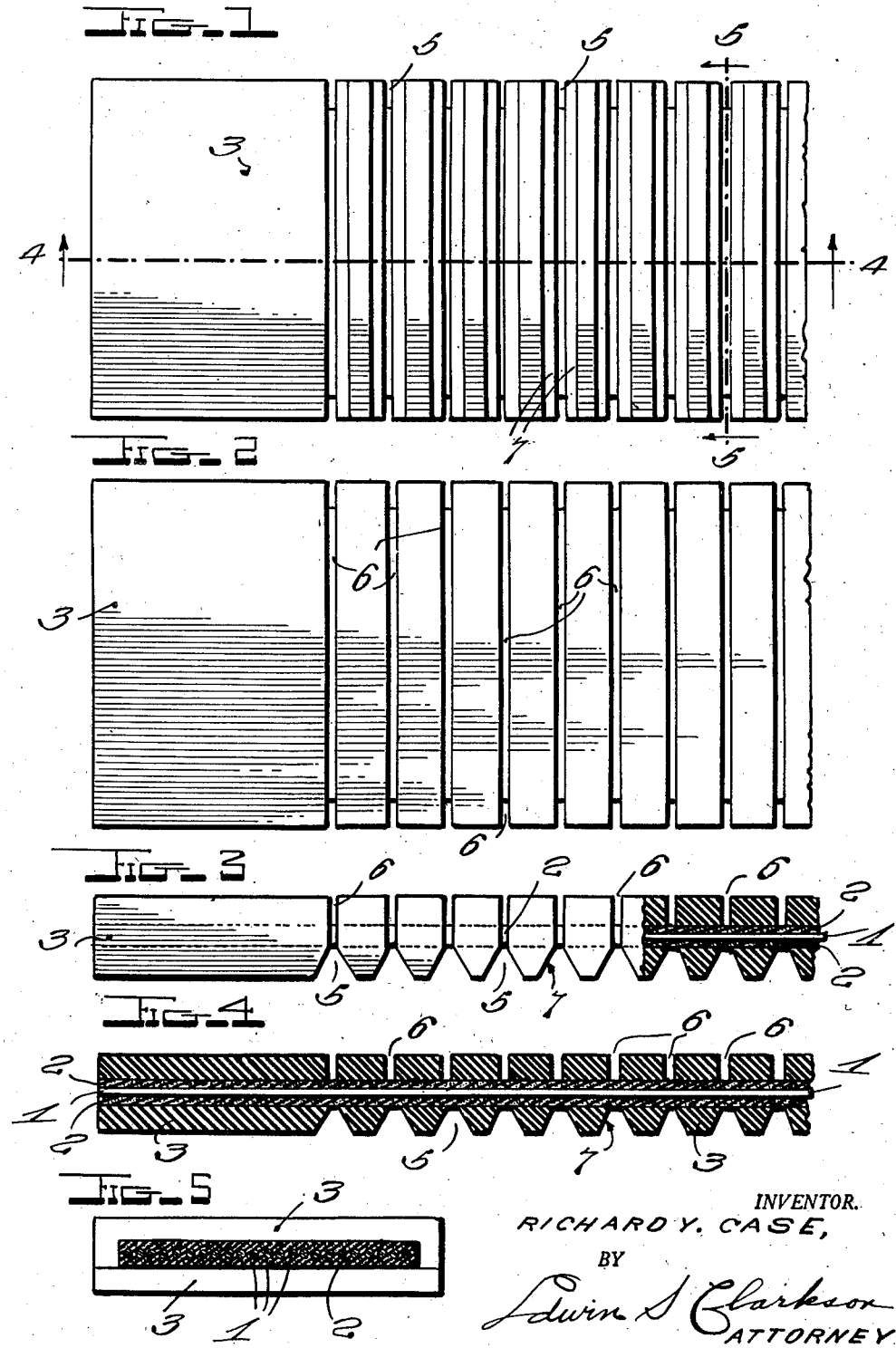

2,348,522

UNITED STATES PATENT OFFICE 2,348,522

CUT TOOTH POWER TRANSMISSION BELT AND BLANK FOR THE SAME

Richard Y. Case, Philadelphia, Pa., assignor to L. H. Gilmer Co., Tacony, Philadelphia, Pa., a corporation of New Jersey Original application March 13, 1941, Serial No. 383,236. Divided and this application August 29, 1941, Serial No. 408,880

1 Claim. (Cl. 74—236)

In V-belts, as heretofore made, the side driving walls of the belt bulge in contacting the walls of the pulley whereby the said walls wear unevenly. The friction on these bulging walls is so great that the excessive heat thereby generated has resulted in explosions in the belt, as a result of which the belt is useless.

The primary object of my invention is to provide a power transmission belt which, regardless of its diameter, is adapted to run smoothly over pulleys of various diameter.

Another object of my invention is to provide a toothed belt in which the end walls of the teeth do not bulge when engaging the pulley over which it is moving, thereby retaining a firm continuous contact from top to bottom with the end walls of the belt.

Another object of my invention is to provide a cut toothed power transmission belt adapted to be used on a flat or V-shaped pulley.

Another object of my invention is to provide a power transmission belt comprising a plurality of cut teeth and a pulley, or neutral axis section, said section being molded and vulcanized with said teeth; and with these, and other objects in view, my invention consists of the parts and combination of parts hereinafter set forth.

This is a division of my application filed March 13, 1941, Serial No. 383,236.

In the drawings:

Figure 1 is a bottom plan view, the left hand portion of which shows the belt body as originally molded and vulcanized, the righ hand portion showing teeth cut from said body.

Figure 2 is a top plan view of Figure 1.

Figure 3 is a side elevation of Figure 2, portions being in section.

Figure 4 is a sectional view on the line 4—4, Figure 1.

Figure 5 is a sectional view on the line 5—5, Figure 1.

Figure 6 is a side elevation of a modified form of the belt partially in section.

Figure 7 is a sectional view on the line 7—7, Figure 6.

Figure 8 is a bottom plan view of the belt shown in Figures 6 and 7, partly broken away to expose the neutral zone section.

Figure 9 is a vertical longitudinal section of the belt showing in dotted lines where cuts are to be made in the belt body to form the teeth.

Figure 10 shows the belt applied to a pulley.

The belt, according to my invention, is moulded as shown in Figure 5 which is a transverse sectional view.

The pulling cable cords are designated by the reference numeral 1 of which there may be one or a plurality of layers, according to the work the belt is designed for. The cords are rubberized, or otherwise suitably treated prior to their application in the belt, and they constitute the neutral axis and pulling section of the belt.

The cords 1 are then embedded in a mass of comparatively soft rubber 2, which entirely surrounds the cords, as shown, to prevent friction between the cords and to enable the cords to readily bend around a pulley.

The cords 1 and soft rubber 2 are then enclosed in a casing, or cover, 3, of a material designed to vulcanize hard, or comparatively hard; thus after the assembly of the parts shown in the drawings is properly vulcanized it becomes a substantially rigid structure, which is practically non-flexible throughout its length. It will be understood, of course, that the structure thus formed may be endless, or in lengths, as desired.

After the body is thus formed and vulcanized it is separated into teeth 4 on the compression side of the belt and block-like members 4' on the tension side of the belt along the dotted lines 5 and 6, as shown in Figure 9, by cutting in any way found most desirable, but the cutting stops short of the neutral axis structure of soft rubber 2 and cords 1, as clearly shown in the drawings. In other words, the cuts 5 in the side walls terminate at the side edges of the neutral axis structure, while the cuts 6 extend inwardly from the upper or outer surface of the belt and terminate at their inner ends at or adjacent to the outer surface of the neutral axis structure without penetrating the same whereby the body is separated into cut teeth throughout its length, while the neutral axis structure remains continuous and integral throughout the belt.

This improved belt may be constructed as a flat belt, as shown in Figures 1, 2, 3, 4 and 5, and if desired may be formed as an endless substantially V-shaped belt, as shown in Figures 6, 7, 8, 9 and 10.

In both the flat and V belt the cuts from the bottom face of the belt are inclined as at 7, thereby eliminating crowding or contact between the teeth while passing over the pulley 8, as shown in Figure 10.

In the V belt structure I may cover the belt body in a rubberized wrapper 9.

In all forms of belt, according to my invention, the teeth 4 and blocks 4' are hard and non-flexible, whereby the durability of the belt is increased and whereby the ends of the teeth are prevented from bulging and the sides of the blocks from jamming in contacting with the walls of the groove in a pulley, thereby insuring a firm continuous contact from top to bottom of each tooth, in a V belt with the walls of the groove of the pulley, thus materially reducing, if not entirely eliminating, the generation of heat in the belt experienced in the V belts as heretofore constructed, thus prolonging the life of the belt. Thus the compression and tension sides of the belt formed respectively by the blocks and the teeth are hard and incompressible and inexpansible so as to provide a belt which is adapted for long wear and incapable of distortion in the manner mentioned, whereby the noted objections to prior belts are avoided. In this belt, as each hard and incompressible tooth is arranged opposite to and in transverse alinement with a hard and incompressible block-like member, the belt can flex solely along the lines between adjacent pairs of blocks and teeth, so that the belt is adapted to run smoothly over pulleys of various diameters without bulging and becoming overheated.

What I claim is:

A cut tooth power transmission belt consisting of an elastic neutral zone section comprising one or more rows of inextensible pull cords, a soft rubber body in which said cords are invested, an inherently hard vulcanized material surrounding the top, bottom and sides of said neutral zone section and inflexible against compression or expansion and transversely divided into a continuous series of block-like members constituting a continuous series of projecting teeth on the compression side of the neutral zone section, and companion block members on the tension side of the neutral zone section, said tooth members arranged in transverse alignment with the companion block member and entirely separated from the adjacent teeth by intervening transverse divisions whereby the belt is adapted to flex solely on the neutral zone section on lines between the adjacent pairs of companion teeth in block sections.

RICHARD Y. CASE.